(12) United States Patent
Kim et al.

(10) Patent No.: US 10,797,847 B2
(45) Date of Patent: Oct. 6, 2020

(54) METHOD FOR TRANSMITTING ACK/NACK FOR V2X COMMUNICATION IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/307,466

(22) PCT Filed: Jun. 30, 2017

(86) PCT No.: PCT/KR2017/006955
§ 371 (c)(1),
(2) Date: Dec. 5, 2018

(87) PCT Pub. No.: WO2018/004296
PCT Pub. Date: Jan. 4, 2018

(65) Prior Publication Data
US 2019/0349173 A1    Nov. 14, 2019

Related U.S. Application Data

(60) Provisional application No. 62/356,542, filed on Jun. 30, 2016.

(51) Int. Cl.
*H04L 5/00* (2006.01)
*H04W 4/40* (2018.01)
*H04W 72/04* (2009.01)

(52) U.S. Cl.
CPC .......... *H04L 5/0055* (2013.01); *H04L 5/0016* (2013.01); *H04W 4/40* (2018.02); *H04W 72/0446* (2013.01); *H04W 72/0453* (2013.01)

(58) Field of Classification Search
CPC ....... H04L 5/00; H04L 5/0016; H04L 5/0055; H04L 5/0053; H04W 4/40; H04W 72/02;
(Continued)

(56) References Cited

U.S. PATENT DOCUMENTS

2015/0319746 A1   11/2015   Lu et al.
2016/0095133 A1   3/2016   Hwang et al.
(Continued)

FOREIGN PATENT DOCUMENTS

WO   2016085210   6/2016

OTHER PUBLICATIONS

PCT International Application No. PCT/KR2017/006955, Written Opinion of the International Searching Authority dated Oct. 20, 2017, 20 pages.
(Continued)

*Primary Examiner* — Candal Elpenord
(74) *Attorney, Agent, or Firm* — Lee, Hong, Degerman, Kang & Waimey

(57) ABSTRACT

The present invention relates to a method and an apparatus for transmitting, by a vehicle-to-everything (V2X) terminal, acknowledgement/negative acknowledgement (ACK/NACK) in a wireless communication system. Specifically, the method of the present invention comprises the steps of: changing a resource pool configuration for a V2X communication from a first resource pool to a second resource pool; and transmitting the ACK/NACK on the basis of at least one of the first resource pool and the second resource pool, on the basis of a time interval established to select an ACK/
(Continued)

NACK resource pool, with respect to a message received on the basis of the first resource pool.

8 Claims, 11 Drawing Sheets

(58) Field of Classification Search
CPC ............. H04W 72/04; H04W 72/0446; H04W 72/0453
USPC .................................................. 370/328–330
See application file for complete search history.

(56) References Cited

U.S. PATENT DOCUMENTS

| | | | |
|---|---|---|---|
| 2017/0086028 A1* | 3/2017 | Hwang | .................. H04W 4/027 |
| 2017/0295579 A1* | 10/2017 | Sheng | .................... H04W 72/02 |
| 2019/0007974 A1* | 1/2019 | Nguyen | ............ H04W 74/0816 |
| 2019/0037535 A1* | 1/2019 | Sun | ........................ H04W 72/02 |
| 2019/0132818 A1* | 5/2019 | Yasukawa | ............. H04W 72/08 |
| 2019/0132832 A1* | 5/2019 | Uchiyama | ............... H04W 4/40 |

OTHER PUBLICATIONS

ZTE, "Discussion on V2V resource reselection", 3GPP TSG RAN WG1 Meeting #85, R1-164962, May 2016, 3 pages.
NEC, "Resource pool design for collision detection and handling", 3GPP TSG RAN WG1 Meeting #85, R1-164476, May 2016, 3 pages.

* cited by examiner (a) Control plane protocol stack (b) User plane protocol stack (a)

(b)

METHOD FOR TRANSMITTING ACK/NACK FOR V2X COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/006955, filed on Jun. 30, 2017, which claims the benefit of U.S. Provisional Application No. 62/356,542, filed on Jun. 30, 2016, the contents of which are all hereby incorporated by reference herein in their entirety.

TECHNICAL FIELD

The present invention relates to a wireless communication system, and more particularly, to a method of transmitting ACK/NACK for V2X communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the technical task of the present invention is to propose a method of transmitting ACK/NACK for V2X communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting ACKnowledgement/Negative ACKnowledgement (ACK/NACK) by a Vehicle-to-Everything (V2X) user equipment in a wireless communication system, the method including changing a resource pool configuration for V2X communication into a second resource pool from a first resource pool and transmitting the ACK/NACK based on at least one of the first resource pool and the second resource pool on the basis of a time interval configured for an ACK/NACK resource pool selection in response to a message received based on the first resource pool.

Preferably, the time interval may be configured by Radio Resource Control (RRC) signaling.

Preferably, if the ACK/NACK is transmitted within the time interval, the ACK/NACK may be transmitted based on the first resource pool. If the ACK/NACK is transmitted after the time interval, the ACK/NACK may be transmitted based on the second resource pool.

Preferably, if the ACK/NACK is transmitted within the time interval, the ACK/NACK may be transmitted based on both of the first resource pool and the second resource pool. If the ACK/NACK is transmitted after the time interval, the ACK/NACK may be transmitted based on the second resource pool.

Preferably, a resource for transmitting the ACK/NACK may be determined depending on at least one of if an ACK/NACK resource of the first resource pool is Code-Division-Multiplexed (CDMed) in the time interval, whether the number of ACK/NACK frequency resources of the first resource pool is equal to the number of ACK/NACK frequency resources of the second resource pool, whether the first resource pool and the second resource pool are Frequency-Division-Multiplexed (FDMed), and whether the first resource pool and the second resource pool are Time-Division-Multiplexed (TDMed).

Preferably, a resource for transmitting the ACK/NACK may be determined depending on at least one of if an ACK/NACK resource of the first resource pool is Frequency-Division-Multiplexed (FDMed) in the time interval, whether the number of ACK/NACK frequency resources of the first resource pool is equal to the number of ACK/NACK frequency resources of the second resource pool, whether the first resource pool and the second resource pool are Frequency-Division-Multiplexed (FDMed), and whether the first resource pool and the second resource pool are Time-Division-Multiplexed (TDMed).

Preferably, a resource for transmitting the ACK/NACK may be determined depending on at least one of if a first frequency-time resource associated with the message on the first resource pool is Frequency-Division-Multiplexed (FDMed) in the time interval, whether the number of ACK/NACK frequency resources of the first resource pool is equal to the number of ACK/NACK frequency resources of the second resource pool, whether the first resource pool and the second resource pool are FDMed, and whether the first resource pool and the second resource pool are Time-Division-Multiplexed (TDMed).

In another technical aspect of the present invention, provided herein is a Vehicle-to-Everything (V2X) user equipment transmitting ACKnowledgement/Negative ACKnowledgement (ACK/NACK) in a wireless communication system, the V2X user equipment including a radio frequency unit and a processor configured to control signal transmission/reception by being combined with the radio frequency unit, wherein the processor is further configured to change a resource pool configuration for V2X communication into a second resource pool from a first resource pool and transmit the ACK/NACK based on at least one of the first resource pool and the second resource pool on the basis of a time interval configured for an ACK/NACK resource pool selection in response to a message received based on the first resource pool.

Advantageous Effects

According to an embodiment of the present invention, ACK/NACK transmission for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
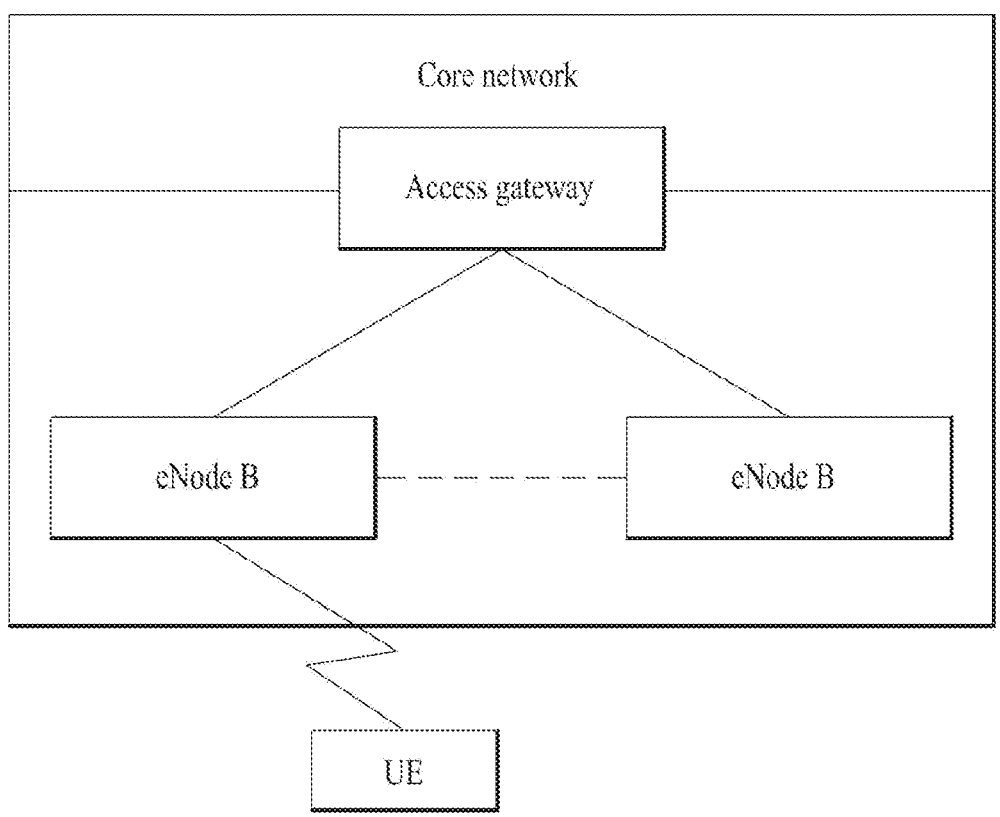
FIG. 1 schematically illustrates an E-UMTS network structure as an example of a wireless communication system.
Figure 2:
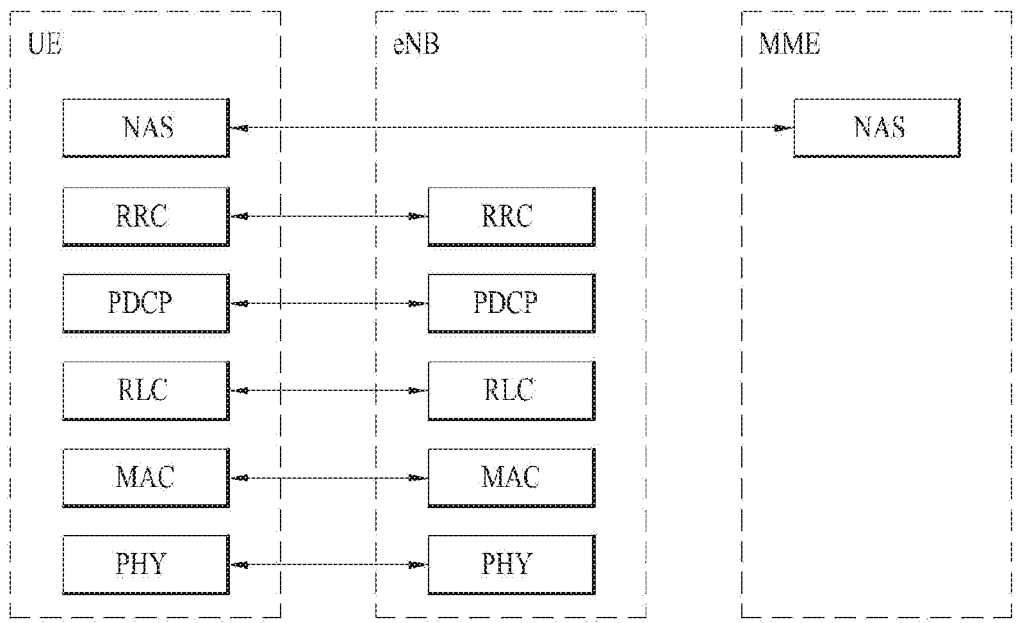
FIG. 2 illustrates control plane and user plane structures of a radio interface protocol between a UE and an E-UTRAN on the basis of the 3GPP wireless access network standard.
Figure 2:
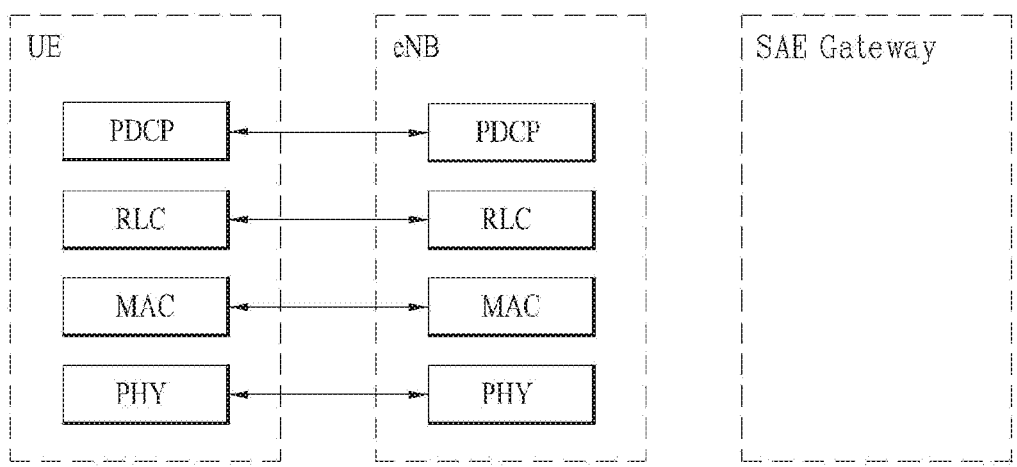

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
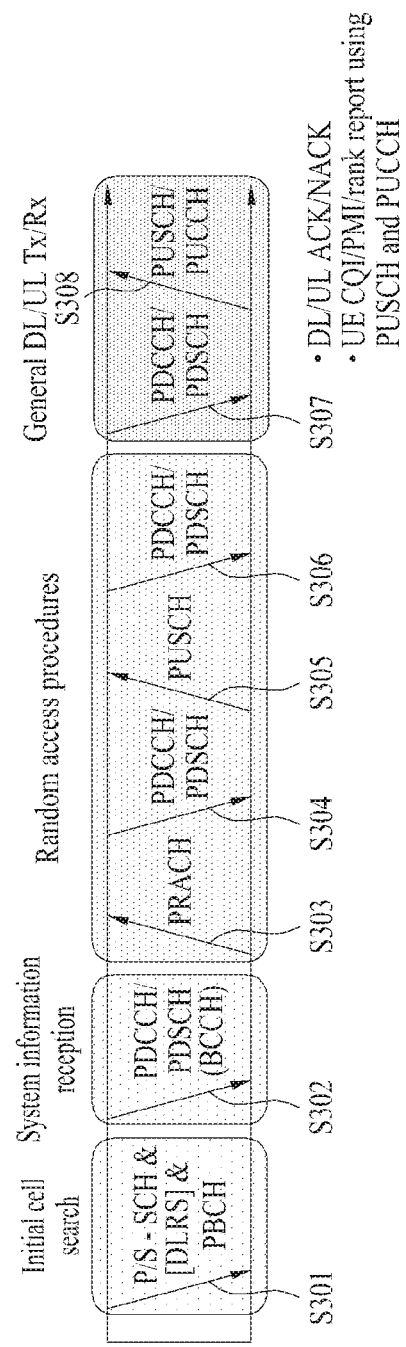
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
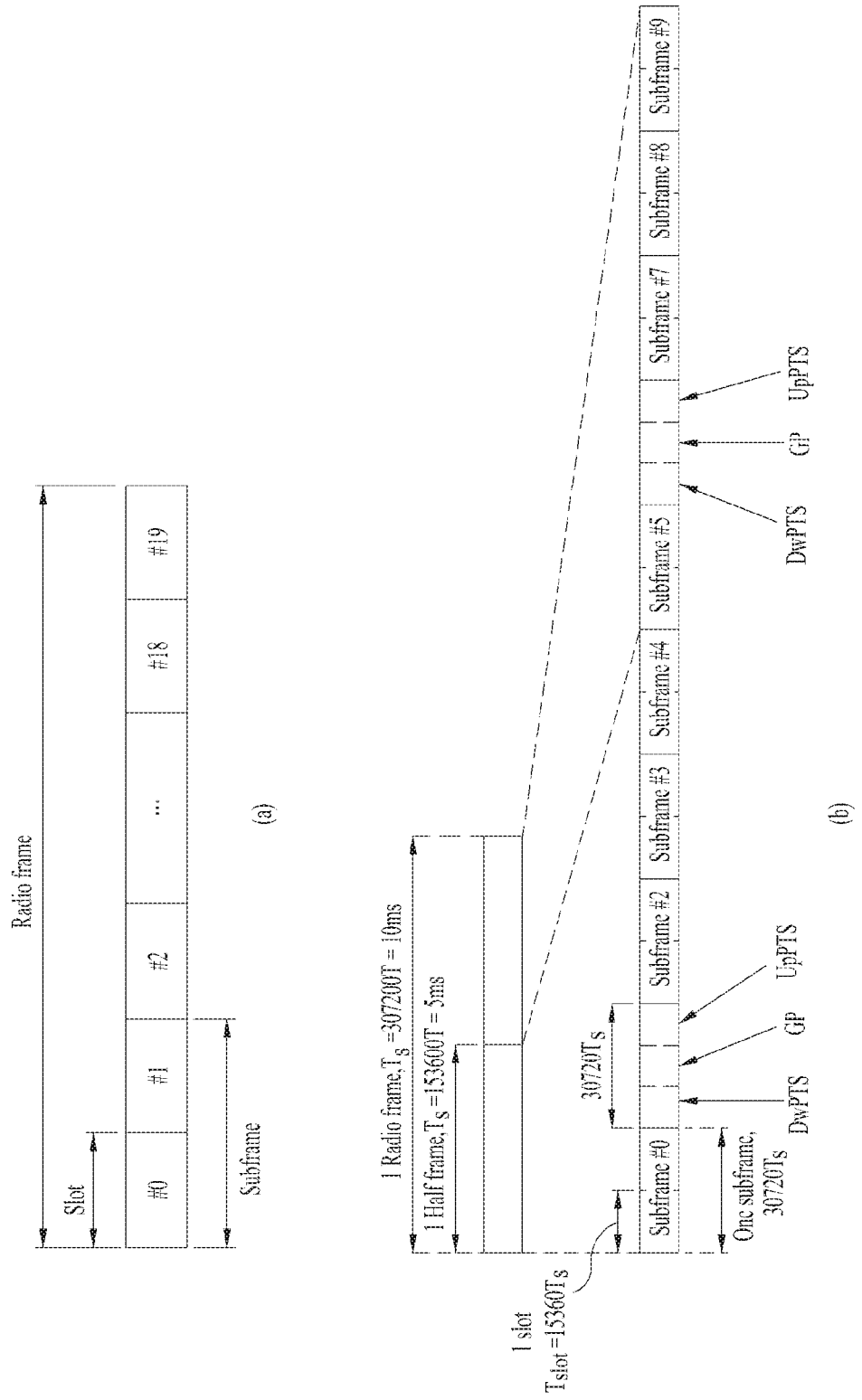
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses 01-DM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
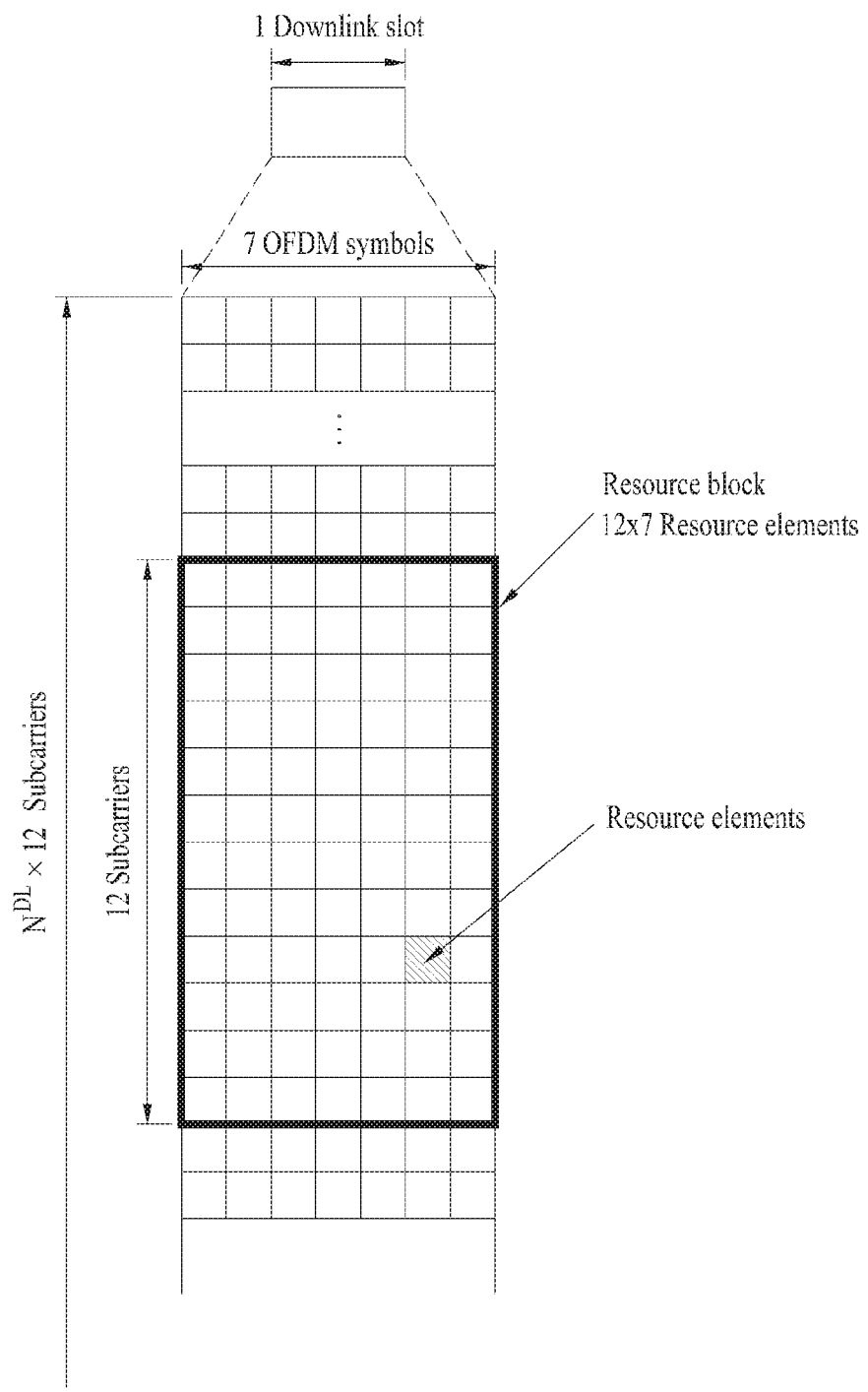
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one 01-DM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
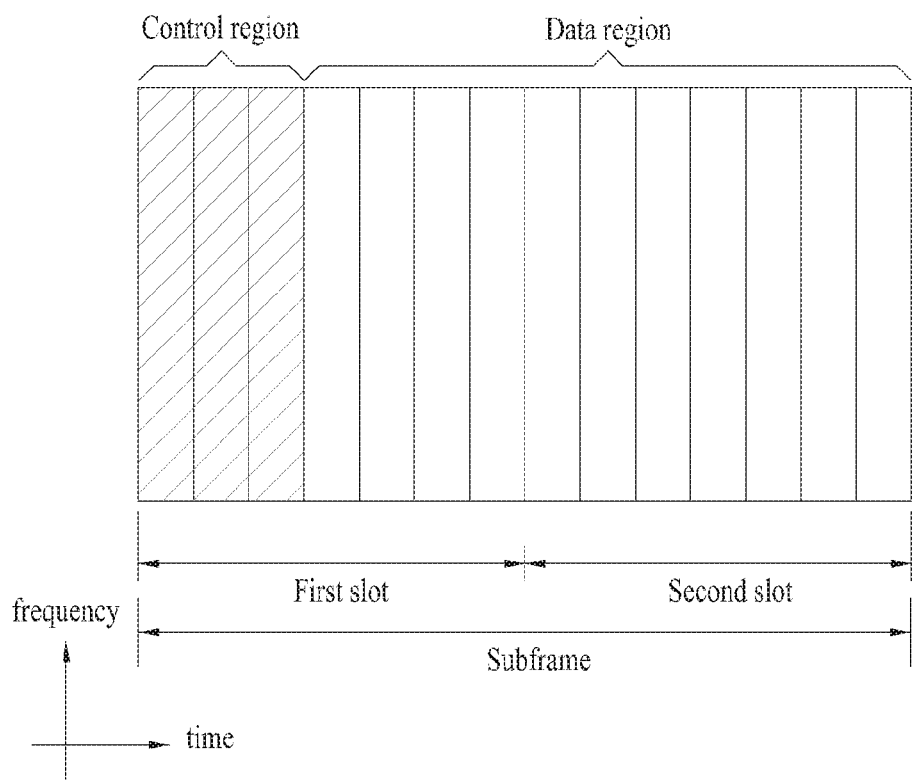
FIG. 6 illustrates a structure of a downlink radio frame used in an LTE system.

FIG. 6 illustrates a structure of a downlink radio frame.

TABLE 1

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
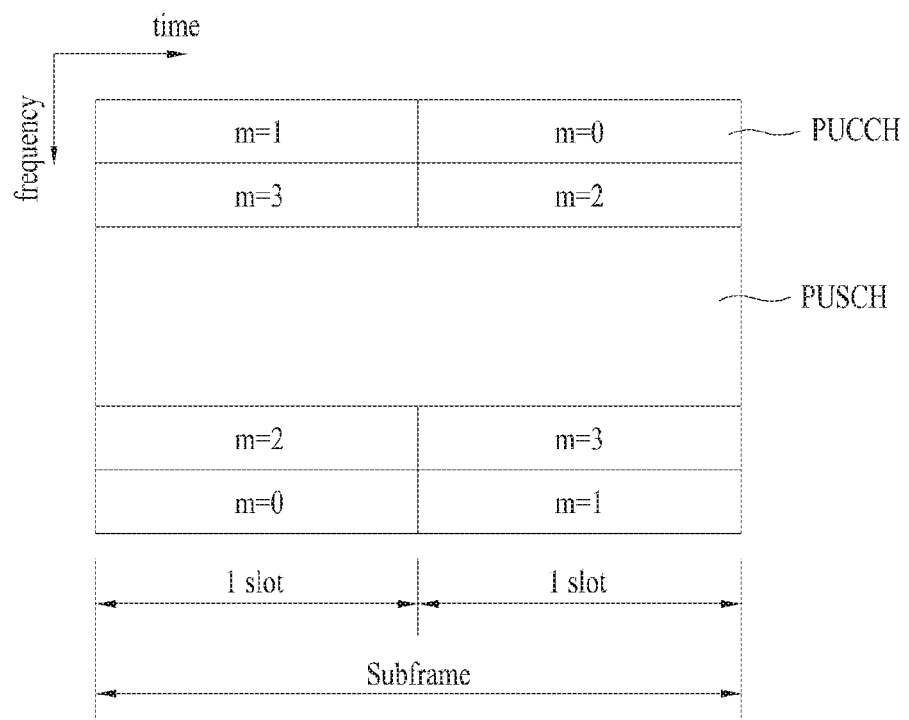
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Figure 8:
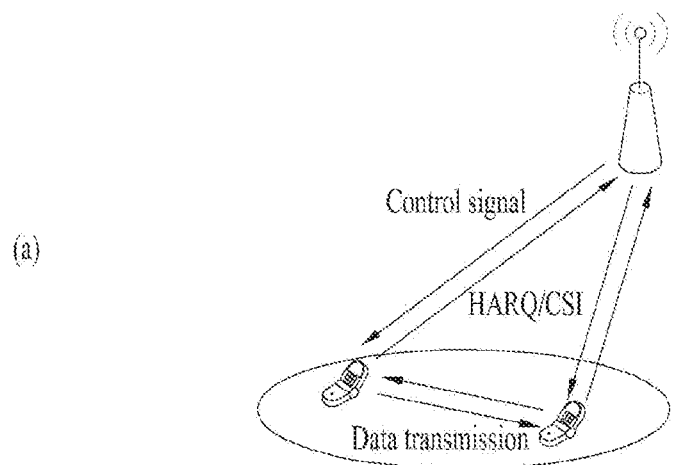
FIG. 8 is a reference diagram to describe D2D (UE-to-UE) communication.
Figure 8:
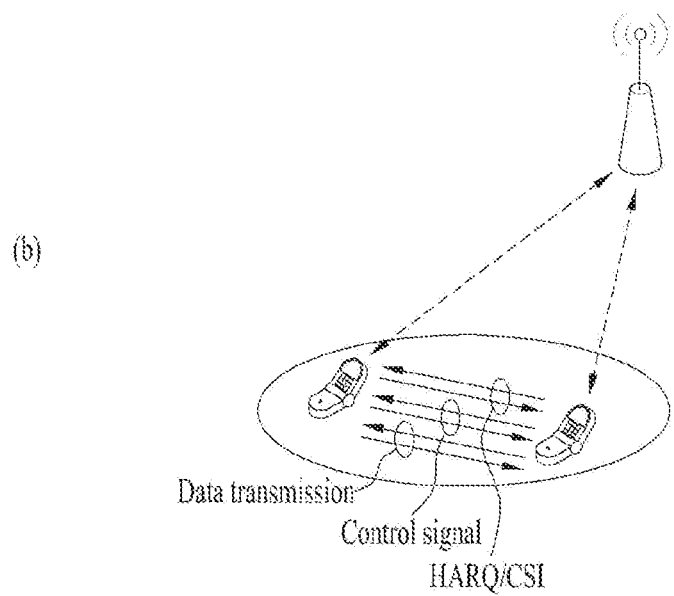

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
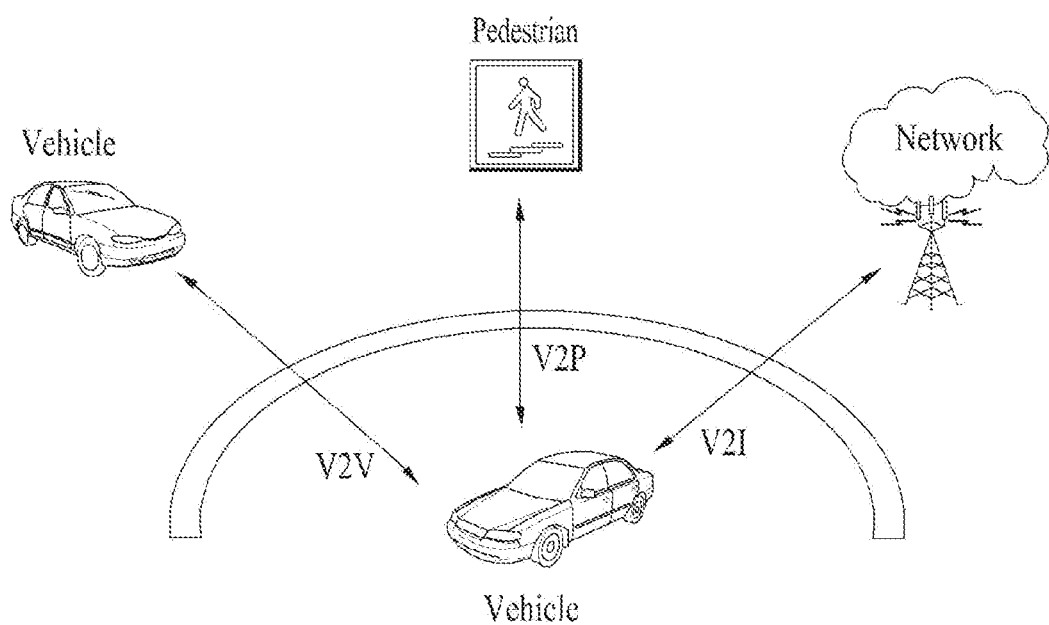
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
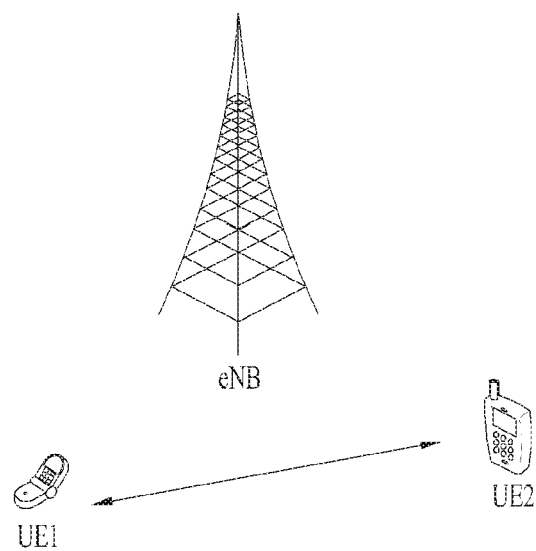
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
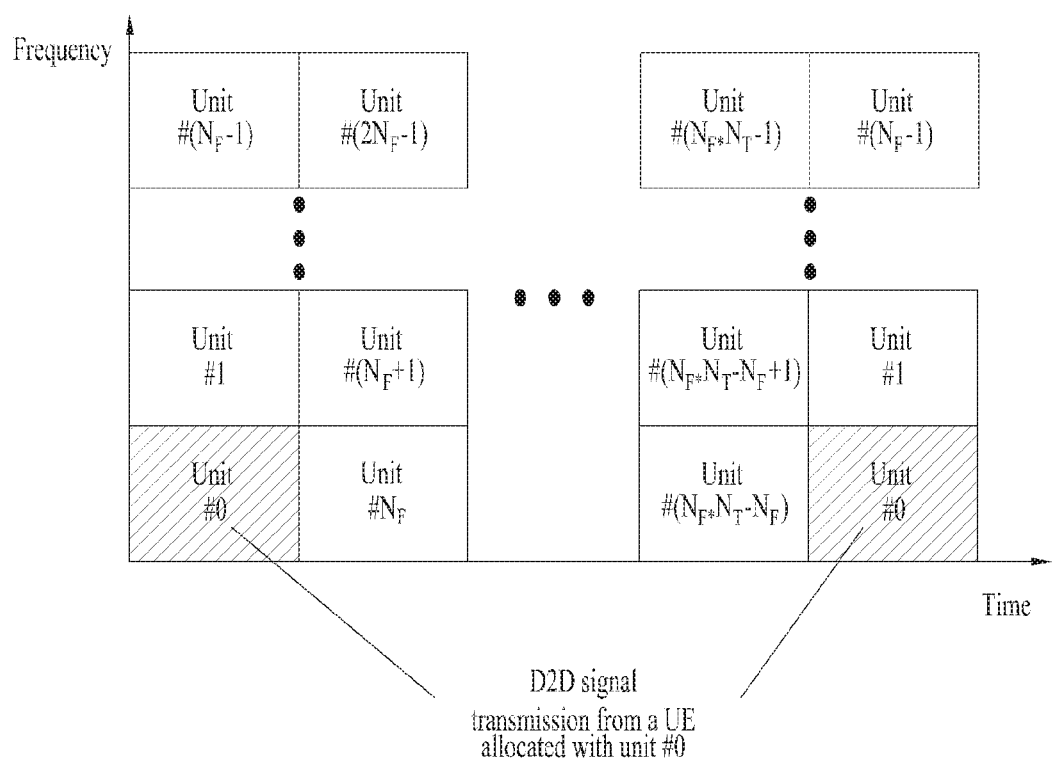

FIG. 11 shows one example of a configuration of resource unit. FIG. 11 illustrates a case that total $N_F * N_T$ resource units are defined in a manner of dividing a full frequency resource into $N_F$ units and dividing a full time resource into $N_T$ units. In FIG. 11, a corresponding resource pool is repeated every $N_T$ subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission (Tx) resource of an individual signal is designated to an individual Tx UE by an eNB, or whether an individual Tx UE selects an individual signal Tx resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a Tx resource of a D2D Tx UE in D2D communication is defined as Mode 1. And, a method for a UE to directly select a Tx resource, when a Tx resource region is configured in advance or an eNB designates a Tx resource region, is defined as Mode 2. In case of D2D discovery, a case that an eNB directly indicates a resource is defined as Type 2. And, a case that a UE directly selects a Tx resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and the determines whether to become a synchronization source by measuring RSRP of this signal and the like.

Moreover, in case of V2X communication, a control channel and a data channel are regarded as existing like D2D. Thus, when there exist a control channel and a data channel associated with the control channel, assume a situation that several vehicles come in and transmit periodic messages. Assuming that a vehicle is a UE, the UE can obtain resources location of the currently transmitted messages by decoding a currently transmitted control channel or performing energy sensing of a data channel And, the UE may further obtain resource locations that will be transmitted by Tx UEs.

Based on the aforementioned contents, according to the present invention, when multiple nodes communicate with each other like a platooning service in V2X, a method of transmitting/receiving ACK/NACK resource therefor is described in detail.

Currently, the 5G new RAT discusses a platooning service for V2X technology. The platooning service means a service that V2X applied devices (e.g., cars) move together by gathering in a row. Here, a tanker of the platooning service, i.e., a foremost vehicle among the gathering vehicles of the platooning service drives as a representative of the gathering vehicles and the rest of the vehicles automatically move along the tanker without driver's manipulation. Such an operation of the platooning service can advantageously raise fuel efficiency of a vehicle. Therefore, for such a platooning service, it is necessary to form a communication group in a short range among the platooning vehicles.

Currently, in LTE V2X, areas are divided into small areas and each of the small areas is mapped to a different resource pool. Hence, whenever a small area is changed according to a movement of each vehicle, the corresponding vehicle changes to use a resource pool of its own. This may be called location based resource pool allocation. Such a scheme plays a significant role in lowering interferences or in-band emissions of Tx messages on a boundary of a small area.

For example, as a small area is changed in a platooning service, when a resource pool is changed, there may be a situation that a prescribed UE in the platooning changes a Tx resource pool into B from A only. Particularly, for example, assuming that vehicles #1 to #4 transmit ack/nack in response to a message transmitted by a vehicle #5 among the vehicles #1 to #5, the vehicles #1 and #2 change a resource pool into the resource pool B but the vehicles #3 to #5 may continue to use the resource pool A. In doing so, in case of operating as an LTE Release 12 based system, since the vehicles #1 and #2 are set to perform signal transmissions based on the resource pool B, they should transmit ack/nack on the resource pool B. Hence, as the vehicles #3 and #4 transmit ack/nack on the resource pool A, the vehicle #5 may be faced with an obscure situation in determining whether the vehicle #5 is transmitting ack/nack on the resource pool A or the resource pool B.

Therefore, according to the present invention, when an ACK/NACK resource of a platooning service is designed, cases of methods 1 to 4 described in the following can be assumed.

Method 1: An Rx UE transmits ack/nack on a resource pool selected to make transmission of its own. Hence, a Tx UE assumes that ack/nack for a message can be received on both a message transmitted resource pool and a resource pool mapped to an area adjacent thereto.

Method 2: An Rx UE transmits ack/nack for a message on a resource pool on which the message was received by the Rx UE. A Tx UE assumes that it will receive ack/nack for the corresponding message on the resource pool on which the Tx UE transmitted the message.

Method 3: After changing a Tx resource pool due to a change of a small area, an Rx UE transmits ack/nack for a message, which was received on a previous resource pool, on a resource pool on which the Rx UE receives a message within a time T. After the time T, the Rx UE transmits ack/nack on a resource pool selected to make transmission of its own. Here, the time T means a time T after a time at which a Tx message was transmitted. This value may be configured in advance or by RRC signaling. In doing so, a Tx UE assumes that ack/nack for a message is received on a resource pool, on which the Tx UE transmitted the message, within the time T. The Tx UE assumes that after the time T, ack/nack for the corresponding message can be received on both of a message transmitted resource pool and a resource pool mapped to an area adjacent thereto.

Method 4: After changing a Tx resource pool due to a change of a small area, an Rx UE transmits ack/nack for a message, which was received on a previous resource pool, on both of the previous resource pool and the currently changed resource pool within a time T. After the time T, the Rx UE transmits ack/nack on the currently changed pool only. Here, the time T means a time T after a time at which a Tx message was transmitted. This value may be configured in advance or by RRC signaling. Within the time T, a Tx UE assumes that the Rx UE can transmit ack/nack for a message duplicately on a resource pool, on which the message was transmitted, and a resource pool mapped to an area adjacent thereto. After the time T, the Tx UE assumes that ack/nack can be received on both of the message transmitted resource pool and the resource pool mapped to the area adjacent thereto.

The method 1 is similar to a transmission methodology of the current LTE V2X. This is because ack/nack is transmitted on a resource pool mapped to an area to which a UE belongs. Yet, in such a case, since it is unclear when a resource pool will be changed, UEs in the platoon should always monitor ack/nack transmission up to a resource pool mapped to an adjacent area.

Regarding the method 2, since ack/nack is always transmitted on a message transmitted resource pool, a Tx UE can lower complexity by monitoring ack/nack on a resource pool transmitted by the Tx UE only. Yet, although a small area is changed, since ack/nack is still transmitted using a resource pool mapped to a previous area, interference or in-band emission may be caused by the resource pool mapped to the previous area.

The method 3 is the invention having the advantages of the methods 1 and 2 combined therein. Although the advantages of the method 2 are obtained for a predetermined time, after a time expires, ack/nack is transmitted on a resource pool corresponding to a small area to which a UE belongs only, whereby influence due to interference and in-band emission caused to a previous area can be reduced.

Regarding the method 4, for a predetermined time, if an Rx UE changes a resource pool, ack/nack is transmitted on both a changed resource pool and a previous resource pool, whereby ack/nack reliability can be raised advantageously. If the predetermined time expires, ack/nack is transmitted only on a resource pool corresponding to a small area to which a UE belongs, whereby influence due to interference and in-band emission caused to a previous area can be reduced.

For the aforementioned methods 1, 3 and 4, there is a problem that an Rx UE will transmit ack/nack on which resource in a changed resource pool. Therefore, according to the present invention, on the assumption that an ack/nack Tx resource of a message transmitted resource pool is designed, it is described that ack/nack will be transmitted on which resource in a changed resource pool in association with the designed ACK/NACK Tx resource.

For clarity of the following description, a resource pool on which a message is transmitted shall be named a resource pool R and a Tx resource pool of an Rx UE changed due to a change of a location shall be named a resource pool N. An ACK/NACK resource associated with a message transmitted on the resource pool R shall be named an RA resource and an ACK/NAC resource necessary to be newly designed in the resource pool N shall be called an NA resource.

First Embodiment

According to a first embodiment of the present invention, ACK/NACK resource allocation is described by focusing on a case that an RA resource of a resource pool R is Code-Division-Multiplexed (CDMed) in a time interval t.

In a state that an RA resource of a resource pool R is CDMed in a time interval t, if the number of ack/nack frequency resources of the resource pool R is equal to the number of ack/nack frequency resources of a resource pool N and the resource pool R and the resource pool N are Frequency-Division-Multiplexed (FDMed), an NA resource of the resource pool N becomes the time interval t and the ack/nack is transmitted by being CDMed. If the resource pool N or an ack/nack resource of the resource pool N does not exist in the time interval t, ack/nack is CDMed and transmitted on an ack/nack resource of a nearest resource pool N according to a future time elapse after the time interval t. Namely, ack/nack is transmitted at the same timing of an RA resource as close as possible, whereby latency is not affected.

In a state that an RA resource of a resource pool R is CDMed in a time interval t, the number of ack/nack frequency resources of the resource pool R is different from the number of ack/nack frequency resources of a resource pool N and the resource pool R and the resource pool N are FDMed. In such a case, an NA resource of the resource pool N becomes a time interval t and ack/nack is transmitted by being associated with a length of ack/nack frequency resources of the resource pool R and another resource pool N. If the resource pool N or an ack/nack resource of the resource pool N does not exist in the time interval t, ack/nack is CDMed and transmitted on an ack/nack resource of a resource pool N appearing according to a future time elapse after the time interval t. Namely, ack/nack is transmitted at the same timing of an RA resource as close as possible, whereby latency is not affected.

In a state that an RA resource of a resource pool R is CDMed in a time interval t, when the number of time resources of the resource pool R is equal to the number of time resources of a resource pool N (or, the number of time resources of ack/nack of the resource pool R is equal to the number of time resources of ack/nack of the resource pool N) and the resource pool R and the resource pool N are TDMed, if there is a shift amounting to a time interval tt between first time resources of a resource pool N and a resource pool R appearing in the future in the resource pool R, an NA resource becomes t+tt and ack/nack is transmitted by being CDMed. If the resource pool N or an ack/nack resource of the resource pool N does not exist in the time interval t+tt, ack/nack is CDMed and transmitted on an ack/nack resource of a nearest resource pool N according to a time elapse after the time interval t+tt. Here, considering latency, it is preferable that ack/nack is directly transmitted on a first resource of a first appearing resource pool N. Yet, if so, since there are frequent collisions between acks/nacks on the first resource, it is preferable to design a spacing in between.

If a time interval t is a resource pool R is an $r^{th}$ time resource, ack/nack is transmitted on an $r^{th}$ time resource in a resource pool N. This is to equally use resources of the resource pool N.

If a time interval t in a resource pool R is an $r^{th}$ ack/nack time resource, ack/nack is transmitted on an $r^{th}$ ack/nack time resource in a resource pool N. This may be designed to equally use ack/nack resources of the resource pool N.

In a state that an RA resource of a resource pool R is CDMed in a time interval t, when the number of time resources of the resource pool R is different from the number of time resources of a resource pool N and the resource pool R and the resource pool N are TDMed, if there is a shift amounting to a time interval tt between first time resources of a resource pool N and a resource pool R appearing in the future in the resource pool R, an NA resource becomes t+tt and ack/nack is transmitted by being CDMed. If the resource pool N or an ack/nack resource of the resource pool N does not exist in the time interval t+tt, ack/nack is CDMed and transmitted on an ack/nack resource of a resource pool N appearing in a nearest future time after the time interval t+tt. Here, considering latency, it is preferable that ack/nack is directly transmitted on a first resource of a first appearing resource pool N. Yet, if so, since there are frequent collisions between acks/nacks on the first resource, it is designed in a manner of leaving a spacing in between.

Moreover, In a state that an RA resource of a resource pool R is CDMed in a time interval t, when the number of time resources of the resource pool R is different from the number of time resources of a resource pool N and the resource pool R and the resource pool N are TDMed, if a time interval t in the resource pool R is an $r^{th}$ time resource and a time resource of the resource pool R is smaller than an ack/nack time resource of the resource pool N, ack/nack is transmitted on a time resource in order greater than $$(r-1)\times\left\lceil\frac{N_N}{N_R}\right\rceil$$

and equal to or smaller than $$r\times\left\lceil\frac{N_N}{N_R}\right\rceil$$

in the resource pool N. Here, $N_R$ is the number of time resources of the resource pool R and $N_N$ is the number of time resources of the resource pool N. Since several time resources of the resource pool N are mapped to a single time resource of the resource pool R, transmitting ack/nack on which one of the time resources may be linked to another index. For example, an Rx UE ID may be linked to an index for transmitting ack/nack. This is to equally use resources of the resource pool N. If a time interval t is an $r^{th}$ time resource in the resource pool R and time resources of the resource pool R are more than time resources of the resource pool N, ack/nack is transmitted on $$\left(r\times\left\lceil\frac{N_N}{N_R}\right\rceil\right)^{th}$$

time resource in the resource pool N. This is to equally use resources of the resource pool N.

Moreover, In a state that an RA resource of a resource pool R is CDMed in a time interval t, if a time interval t in the resource pool R is an $r^{th}$ ack/nack time resource and an ack/nack time resource of the resource pool R is smaller than an ack/nack time resource of the resource pool N, ack/nack is transmitted on an ack/nack time resource in order greater than $$(r-1)\times\left\lceil\frac{N_N}{N_R}\right\rceil$$

and equal to or smaller than $$r\times\left\lceil\frac{N_N}{N_R}\right\rceil$$

in the resource pool N. Here, $N_R$ is the number of ack/nack time resources of the resource pool R and $N_N$ is the number of ack/nack time resources of the resource pool N. Since several ack/nack time resources of the resource pool N are mapped to a single ack/nack time resource of the resource pool R, transmitting ack/nack on which one of the ack/nack time resources may be linked to another index. For example, an Rx UE ID may be linked to an index for transmitting ack/nack. This is to equally use ack/nack resources of the resource pool N. If a time interval t is an $r^{th}$ ack/nack time resource in the resource pool R and ack/nack time resources of the resource pool R are more than ack/nack time resources of the resource pool N, ack/nack is transmitted on $$\left(r\times\left\lceil\frac{N_N}{N_R}\right\rceil\right)^{th}$$

time resource in the resource pool N. This is to equally use ack/nack resources of the resource pool N.

According to the first embodiment, through sensing, a UE may be aware that an ACK/NACK resource intended to use currently is possibly usable by another UE. In this case, instead of using an ack/nack resource intended to use, ack/nack can be transmitted on an ack/nack time resource (determined as not used by another UE among ack/nack time resources of the resource pool N) closest according to a future time elapse.

Moreover, if a resource pool is configured for both TDM and FDM, the aforementioned methods of the first embodiment can be used by being combined with each other.

Second Embodiment

According to a second embodiment of the present invention, the following description is made by focusing on a case that an RA resource of a resource pool R is FDMed on an $f^{th}$ ack/nack frequency resource in a time interval t.

In a state that an RA resource of a resource pool R is FDMed on an $f^{th}$ ack/nack frequency resource in a time interval t, if the number of ack/nack frequency resources of the resource pool R is equal to the number of ack/nack frequency resources of a resource pool N and the resource pool R and the resource pool N are FDMed, an NA resource of the resource pool N becomes the time interval t and the ack/nack is transmitted on the $f^{th}$ ack/nack frequency resource of the resource pool N by being FDMed. If the resource pool N or an ack/nack resource of the resource pool N does not exist in the time interval t, ack/nack is FDMed and transmitted on an $f^{th}$ ack/nack frequency resource of a resource pool N appearing in the nearest future time after the time interval t. Namely, ack/nack is transmitted at the same timing of an RA resource as close as possible, whereby latency is not affected.

In a state that an RA resource of a resource pool R is FDMed on an $f^{th}$ ack/nack frequency resource in a time interval t, when the number of ack/nack frequency resources of the resource pool R is different from the number of ack/nack frequency resources of a resource pool N and the resource pool R and the resource pool N are FDMed, if an NA resource of the resource pool N becomes the time interval t and a frequency resource of the resource pool R is smaller than a frequency resource of the resource pool N, ack/nack is transmitted on an ack/nack frequency resource in order greater than $$(f-1) \times \left\lceil \frac{N_{fN}}{N_{fR}} \right\rceil$$

and equal to or smaller than $$f \times \left\lceil \frac{N_{fN}}{N_{fR}} \right\rceil.$$

Here, $N_{fR}$ is the number of ack/nack frequency resources of the resource pool R and N is the number of ack/nack frequency resources of the resource pool N. Since several ack/nack frequency resources of the resource pool N are mapped to a single ack/nack frequency resource of the resource pool R, transmitting ack/nack on which one of the ack/nack frequency resources may be linked to another index. For example, an Rx UE ID may be linked to an index for transmitting ack/nack. This is to equally use ack/nack resources of the resource pool N. If ack/nack frequency resources of the resource pool R are more than ack/nack frequency resources of the resource pool N, ack/nack is transmitted on $$\left( f \times \left\lceil \frac{N_{fN}}{N_{fR}} \right\rceil \right)^{th}$$

ack/nack frequency resource in the resource pool N. This is to equally use ack/nack resources of the resource pool N.

If the resource pool N or an ack/nack resource of the resource pool N does not exist in the time interval t, ack/nack is transmitted on an ack/nack resource of a resource pool N appearing in the nearest future time after the time interval t. Namely, ack/nack is transmitted at the same timing of an RA resource as close as possible, whereby latency is not affected.

In a state that an RA resource of a resource pool R is FDMed on an $f^{th}$ ack/nack frequency resource in a time interval t, when the number of ack/nack time resources of the resource pool R is equal to the number of ack/nack time resources of a resource pool N and the resource pool R and the resource pool N are FDMed, if the time interval t in the resource pool R is an $r^{th}$ ack/nack time resource, ack/nack is FDMed and transmitted on an $r^{th}$ ack/nack time resource and an $f^{th}$ ack/nack frequency resource in the resource pool N. This is to equally use ack/nack resources of the resource pool N.

In a state that an RA resource of a resource pool R is FDMed on an $f^{th}$ ack/nack frequency resource in a time interval t, if the number of ack/nack time resources of the resource pool R is different from the number of ack/nack time resources of a resource pool N and the resource pool R and the resource pool N are TDMed, ack/nack is transmitted on the $P^h$ ack/nack frequency resource in the resource pool R. If the time interval t in the resource pool R is an $r^{th}$ ack/nack time resource and an ack/nack time resource of the resource pool R is smaller than an ack/nack time resource the resource pool N, ack/nack is transmitted on an ack/nack time resource in order greater than $$(r-1) \times \left\lceil \frac{N_N}{N_R} \right\rceil$$

and equal to or smaller than $$r \times \left\lceil \frac{N_N}{N_R} \right\rceil$$

in the resource pool N. Here, $N_R$ is the number of ack/nack time resources of the resource pool R and $N_N$ is the number of ack/nack time resources of the resource pool N. Since several ack/nack time resources of the resource pool N are mapped to a single ack/nack time resource of the resource pool R, transmitting ack/nack on which one of the ack/nack time resources may be linked to another index. For example, an Rx UE ID may be linked to an index for transmitting ack/nack. This is to equally use ack/nack resources of the resource pool N. If the time interval t is the $r^{th}$ ack/nack time resource in the resource pool R and ack/nack time resources of the resource pool R are more than ack/nack time resources of the resource pool N, ack/nack is transmitted on $$\left( r \times \left\lceil \frac{N_N}{N_R} \right\rceil \right)^{th}$$

ack/nack time resource in the resource pool N. This is to equally use ack/nack resources of the resource pool N.

According to the second embodiment, through sensing, a UE may be aware that an ACK/NACK resource intended to use currently is possibly usable by another UE. In this case, instead of using an ack/nack resource intended to use, ack/nack can be transmitted on an ack/nack time resource (determined as not used by another UE among ack/nack time resources of the resource pool N) closest according to a future time elapse.

Moreover, if a resource pool is TDMed and FDMed both, a combination according to the second embodiment of the present invention may be usable. Namely, after frequency priority orders are determined by time in a resource pool R, when an $r^{th}$ ack/nack time-frequency resource is an RA, if an ack/nack time-frequency resource of the resource pool R is smaller than an ack/nack time-frequency resource of a resource pool N, ack/nack is transmitted on an ack/nack time-frequency resource in order greater than $$(r-1) \times \left\lceil \frac{N_{fN}}{N_{fR}} \right\rceil$$

and equal to or smaller than $$r \times \left\lfloor \frac{N_{fN}}{N_{fR}} \right\rfloor.$$

Here, $N_{fR}$ is the number of ack/nack time-frequency resources of the resource pool R and $N_{fN}$ is the number of ack/nack time-frequency resources of the resource pool N. Since several ack/nack time-frequency resources of the resource pool N are mapped to a single ack/nack time-frequency resource of the resource pool R, transmitting ack/nack on which one of the ack/nack time-frequency resources may be linked to another index. For example, an Rx UE ID may be linked to an index for transmitting ack/nack. This is to equally use ack/nack resources of the resource pool N. After frequency priority orders are determined by time in the resource pool R, when an $r^{th}$ ack/nack time-frequency resource is an RA, if ack/nack time-frequency resources of the resource pool R are more than ack/nack time-frequency resources of the resource pool N, ack/nack is transmitted on an $$\left(r \times \left\lfloor \frac{N_{fN}}{N_{fR}} \right\rfloor\right)^{th}$$

ack/nack time-frequency resource in the resource pool N. This is to equally use ack/nack resources of the resource pool N.

Third Embodiment

According to a third embodiment of the present invention, as a location of an Rx UE is changed, if a Tx resource pool is changed, assuming that a message transmission of a previous resource pool on which a message was transmitted is made on a currently changed resource pool, the rules for ack/nack transmission defined in a single resource pool can be followed as it is. A method for determining that a Tx message transmitted on a previous resource pool is transmitted on which resource of a currently changed resource pool is described in detail as follows.

For clarity of the following description, a resource pool on which a message is transmitted shall be named a resource pool R and a Tx resource pool of an Rx UE changed due to a change of a location shall be named a resource pool N. A first frequency time resource of a transmitted message in a resource pool R shall be named an RM resource and a first frequency time resource assuming that a message was transmitted in a resource pool N shall be named an NM resource. Here, an NM that is a first resource is designed only, and the rest of resources are assumed as transmitted on the resource pool N in the same resource form of a Tx message transmitted on the resource pool R.

A first frequency time 'NM', which assumes that a message is transmitted on a Tx resource pool of an Rx UE changed due to a change of a location, is described as follows.

A case that an RM resource of a resource pool R is transmitted on an $f^{th}$ ack/nack frequency resource in a time interval t is described as follows. If the number of frequency resources of the resource pool R is equal to the number of frequency resources of a resource pool N and the resource pool R and the resource pool N are FDMed, an NM resource of the resource pool N becomes the time interval t and an NM becomes an $f^{th}$ frequency resource of the resource pool N. Namely, as ack/nack is transmitted at the same timing of an RA resource as close as possible, it is able to avoid generating latency.

If the number of frequency resources of a resource pool R is different from the number of frequency resources of a resource pool N and the resource pool R and the resource pool N are FDMed, an NM resource of the resource pool N becomes a time interval t. If a frequency resource of the resource pool R is smaller than a frequency resource of the resource pool N, an NM becomes a frequency resource in order greater than $$(f-1) \times \left\lfloor \frac{N_{fN}}{N_{fR}} \right\rfloor$$

and equal to or smaller than $$f \times \left\lfloor \frac{N_{fN}}{N_{fR}} \right\rfloor.$$

In the equation, $N_{fR}$ is the number of frequency resources of the resource pool R and $N_{fN}$ is the number of frequency resources of the resource pool N. Since several frequency resources of the resource pool N are mapped to a single frequency resource of the resource pool R, assuming a prescribed one of them as an NM resource may be linked to another index. For example, an Rx UE ID may be linked to an index for transmitting ack/nack. This is to equally use resources of the resource pool N. If frequency resources of the resource pool R are more than frequency resources of the resource pool N, an $$\left(f \times \left\lfloor \frac{N_{fN}}{N_{fR}} \right\rfloor\right)^{th}$$

frequency resource in the resource pool N becomes an NM. This is to equally use resources of the resource pool N.

When the number of time resources of a resource pool R is equal to the number of time resources of a resource pool N and the resource pool R and the resource pool N are TDMed, if a time interval t in the resource pool R is an $r^{th}$ time resource, an $f^{th}$ frequency resource on an $r^{th}$ time resource in the resource pool N becomes an NM. This is to equally use ack/nack resources of the resource pool N.

If the number of time resources of a resource pool R is different from the number of time resources of a resource pool N and the resource pool R and the resource pool N are TDMed, an $f^{th}$ frequency resource in the resource pool R becomes an NM. If a time interval t in the resource pool R is an $r^{th}$ time resource and a time resource of the resource pool R is smaller than a time resource the resource pool N, a time resource in order greater than $$(r-1) \times \left\lceil \frac{N_N}{N_R} \right\rceil$$

and equal to or smaller than $$r \times \left\lceil \frac{N_N}{N_R} \right\rceil$$

in the resource pool N becomes an NM. Here, $N_R$ is the number of time resources of the resource pool R and $N_N$ is the number of time resources of the resource pool N. Since several time resources of the resource pool N are mapped to a single time resource of the resource pool R, assuming which one of the time resources as an NM resource may be linked to another index. For example, an Rx UE ID may be linked to an index for transmitting ack/nack. This is to equally use resources of the resource pool N. If the time interval t is an $r^{th}$ time resource in the resource pool R and time resources of the resource pool R are more than time resources of the resource pool N, $$\left( r \times \left\lceil \frac{N_N}{N_R} \right\rceil \right)^{th}$$

time resource in the resource pool N becomes an NM. This is to equally use resources of the resource pool N.

According to the third embodiment, through sensing, a UE may be aware that an ACK/NACK resource intended to use currently is possibly usable by another UE. In this case, instead of using an ack/nack resource intended to use, ack/nack can be transmitted on an ack/nack time resource (determined as not used by another UE among ack/nack time resources of the resource pool N) closest according to a future time elapse.

If a resource pool is TDMed and FDMed both, a combination according to the third embodiment of the present invention may be usable. After frequency priority orders are determined by time in a resource pool R, when an $r^{th}$ time-frequency resource is an RM, if a time-frequency resource of the resource pool R is smaller than a time-frequency resource of a resource pool N, a time-frequency resource in order greater than $$(r-1) \times \left\lceil \frac{N_{fiN}}{N_{fiR}} \right\rceil$$

and equal to or smaller than $$r \times \left\lceil \frac{N_{fiN}}{N_{fiR}} \right\rceil$$

becomes an NM. Here, $N_{fiR}$ is the number of time-frequency resources of the resource pool R and $N_{fiN}$ is the number of time-frequency resources of the resource pool N. Since several time-frequency resources of the resource pool N are mapped to a single time-frequency resource of the resource pool R, assuming which one of the time-frequency resources as an NM resource may be linked to another index. For example, an Rx UE ID may be linked to an index for transmitting ack/nack. This is to equally use ack/nack resources of the resource pool N. After frequency priority orders are determined by time in the resource pool R, when an $r^{th}$ time-frequency resource is an RM, if time-frequency resources of the resource pool R are more than time-frequency resources of the resource pool N, $$\left( r \times \left\lceil \frac{N_{fiN}}{N_{fiR}} \right\rceil \right)^{th}$$

time-frequency resource in the resource pool N becomes an NM. This is to equally use resources of the resource pool N.

Figure 12:
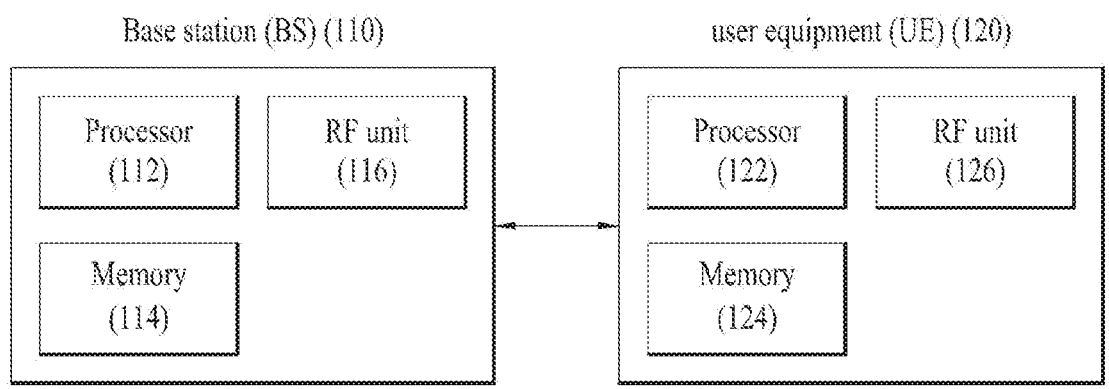
FIG. 12 shows a base station and a user equipment applicable to one embodiment of the present invention.

FIG. 12 illustrates a base station (BS) and a user equipment (UE) applicable to an embodiment of the present invention.

If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As mentioned in the foregoing description, a method of transmitting ACK/NACK for V2X communication in a wireless communication system and apparatus therefor are applicable to various wireless communication systems.

What is claimed is:

1. A method of transmitting ACKnowledgement/Negative ACKnowledgement (ACK/NACK) by a Vehicle-to-Everything (V2X) user equipment in a wireless communication system, the method comprising:
   receiving a message based on a first resource pool for a first region;
   changing a resource pool configuration for V2X communication into a second resource pool for a second region from the first resource pool for the first region by moving from the first region to the second region;
   transmitting the ACK/NACK for the message based on at least one of the first resource pool or the second resource pool when the ACK/NACK is transmitted within a time interval configured for an ACK/NACK resource pool selection after a time at which the message is received; and
   transmitting the ACK/NACK for the message based on the second resource pool when the ACK/NACK is transmitted after the time interval.

2. The method of claim 1, wherein the time interval is configured by Radio Resource Control (RRC) signaling.

3. The method of claim 1, wherein based on the ACK/NACK being transmitted within the time interval, the ACK/NACK is transmitted based on the first resource pool.

4. The method of claim 1, wherein based on the ACK/NACK being transmitted within the time interval, the ACK/NACK is transmitted based on both of the first resource pool and the second resource pool.

5. The method of claim 1, wherein a resource for transmitting the ACK/NACK is determined depending on at least one of if an ACK/NACK resource of the first resource pool is Code-Division-Multiplexed (CDMed) in the time interval, whether a number of ACK/NACK frequency resources of the first resource pool is equal to a number of ACK/NACK frequency resources of the second resource pool, whether the first resource pool and the second resource pool are Frequency-Division-Multiplexed (FDMed), or whether the first resource pool and the second resource pool are Time-Division-Multiplexed (TDMed).

6. The method of claim 1, wherein a resource for transmitting the ACK/NACK is determined depending on at least one of if an ACK/NACK resource of the first resource pool is Frequency-Division-Multiplexed (FDMed) in the time interval, whether a number of ACK/NACK frequency resources of the first resource pool is equal to a number of ACK/NACK frequency resources of the second resource pool, whether the first resource pool and the second resource pool are Frequency-Division-Multiplexed (FDMed), or whether the first resource pool and the second resource pool are Time-Division-Multiplexed (TDMed).

7. The method of claim 1, wherein a resource for transmitting the ACK/NACK is determined depending on at least one of if a first frequency-time resource associated with the message on the first resource pool is Frequency-Division-Multiplexed (FDMed) in the time interval, whether a number of ACK/NACK frequency resources of the first resource pool is equal to a number of ACK/NACK frequency resources of the second resource pool, whether the first resource pool and the second resource pool are FDMed, or whether the first resource pool and the second resource pool are Time-Division-Multiplexed (TDMed).

8. A Vehicle-to-Everything (V2X) user equipment transmitting ACKnowledgement/Negative ACKnowledgement (ACK/NACK) in a wireless communication system, the V2X user equipment comprising:
   a transceiver; and
   a processor configured to control signal transmission/reception by being combined with the transceiver,
   wherein the processor is further configured to:
   receive a message based on a first resource pool for a first region;
   change a resource pool configuration for V2X communication into a second resource pool for a second region from the first resource pool for the first region by moving from the first region to the second region;
   transmit the ACK/NACK for the message based on at least one of the first resource pool or the second resource pool when the ACK/NACK is transmitted within a time interval configured for an ACK/NACK resource pool selection after a time at which the message is received; and
   transmit the ACK/NACK for the message based on the second resource pool when the ACK/NACK is transmitted after the time interval.

* * * * *